United States Patent
Bracalente et al.

(10) Patent No.: US 10,286,867 B2
(45) Date of Patent: May 14, 2019

(54) SYSTEM FOR SENSING VEHICLE CONDITIONS

(71) Applicant: TRW AUTOMOTIVE U.S. LLC, Livonia, MI (US)

(72) Inventors: Marco Bracalente, Novi, MI (US); Neil G. Murray, Jr., Wixom, MI (US); Mark W. Ramsay, Livonia, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 15/632,545

(22) Filed: Jun. 26, 2017

(65) Prior Publication Data

US 2018/0370471 A1 Dec. 27, 2018

(51) Int. Cl.
  *B60R 21/00* (2006.01)
  *B60R 21/013* (2006.01)
  *B60R 21/0132* (2006.01)

(52) U.S. Cl.
  CPC .. *B60R 21/0132* (2013.01); *B60R 2021/0018* (2013.01); *B60R 2021/01306* (2013.01)

(58) Field of Classification Search
  CPC .................. B60R 21/0132; B60R 2021/0018
  USPC ........... 340/425.5, 426, 440; 73/488; 701/45
  See application file for complete search history.

(56) References Cited

U.S. PATENT DOCUMENTS

| 8,156,797 | B2 | 4/2012 | Murray, Jr. et al. |
| 8,966,975 | B2 | 3/2015 | Campbell et al. |
| 2011/0107835 | A1* | 5/2011 | Campbell ......... B29C 45/14655 73/488 |
| 2015/0274105 | A1* | 10/2015 | Le Merrier ........... B60R 21/013 701/45 |

* cited by examiner

*Primary Examiner* — Daryl C Pope
(74) *Attorney, Agent, or Firm* — Tarolli, Sundheim, Covell & Tummino LLP

(57) ABSTRACT

A vehicle safety system for a vehicle includes an electronic control unit (ECU) and at least one remote crash sensor mounted in the vehicle at a location remote from the ECU and operatively connected to the ECU. The remote crash sensor is configured to sense vehicle crash conditions and to provide data related to the sensed vehicle crash conditions to the ECU. An ECU remote sensor is mounted in the vehicle at a location remote from the ECU and near a vehicle center-of-gravity (COG). The ECU remote sensor includes an inertial measurement unit (IMU), and is configured to sense vehicle roll conditions and to provide data related to the sensed vehicle roll conditions to the ECU. The ECU is operative to receive the data provided by the at least one remote crash sensor and the ECU remote sensor, perform calculations to determine whether the data is indicative of a vehicle crash condition, and to provide a signal for actuating a vehicle occupant protection device.

10 Claims, 6 Drawing Sheets

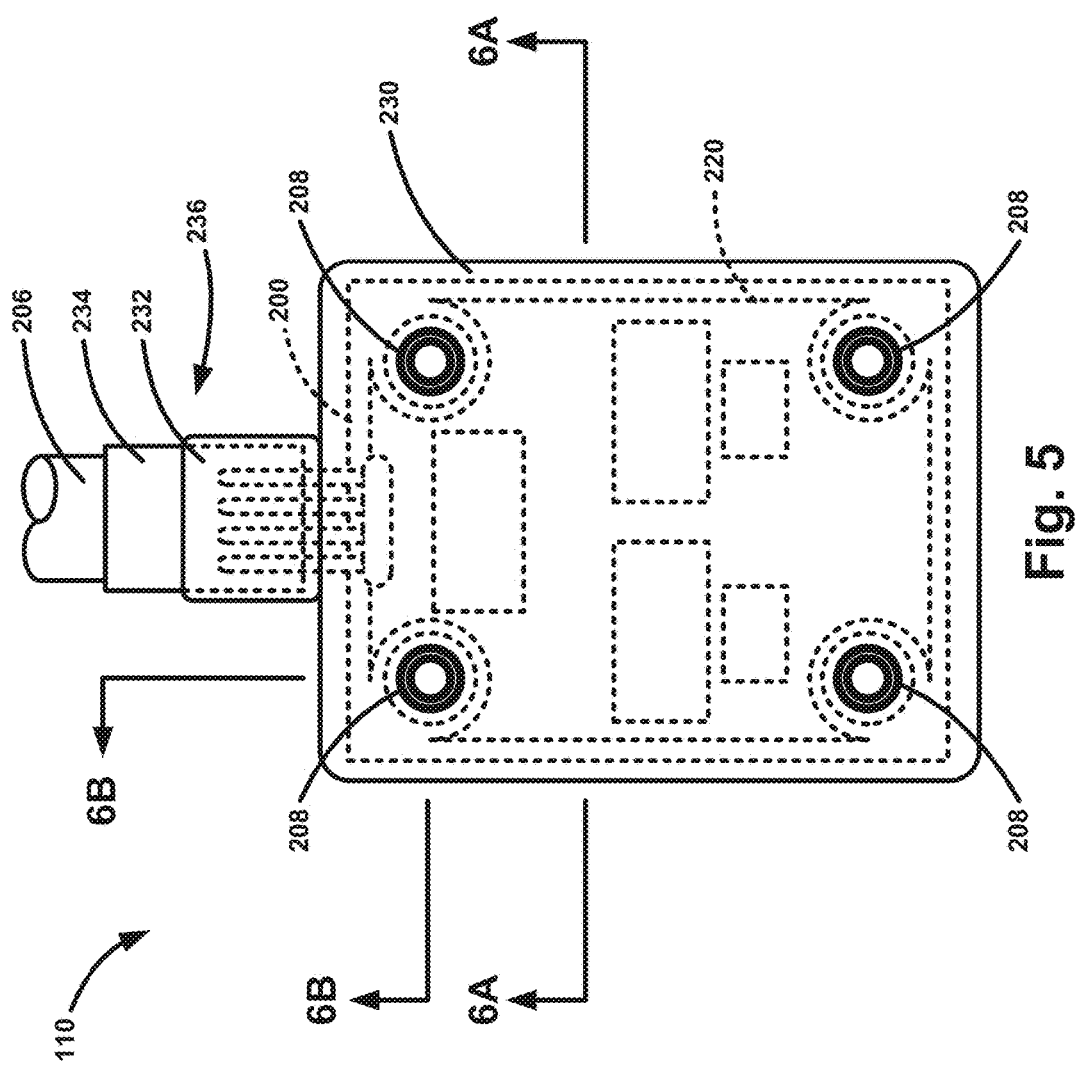

SYSTEM FOR SENSING VEHICLE CONDITIONS

TECHNICAL FIELD

This disclosure relates to a vehicle safety system including sensors for sensing vehicle conditions and a controller for receiving data from the sensors, determining whether a vehicle crash event has occurred based on the data, and actuating one or more vehicle occupant protection devices in response to that determination. More particularly, this disclosure relates to a vehicle safety system including electronic components having an improved distributed architecture.

BACKGROUND

It is known to provide a vehicle safety system including one or more actuatable vehicle occupant protection devices, such as airbags, for helping to protect an occupant upon the occurrence of a vehicle crash event. Such safety systems include an airbag electronic control unit (ECU) and crash sensors (e.g., accelerometers, pressure sensors) positioned at various locations throughout the vehicle. The sensors provide data related to sensed vehicle conditions, which the airbag ECU uses to determine the type of crash that has occurred and which, if any, of the protection devices to actuate. Airbag ECUs also include crash sensors (e.g., accelerometers) that are used to make the baseline determination that the vehicle crash event has occurred/is occurring. Airbag ECUs also include inertia sensors (e.g., gyroscopes) that are used to determine roll conditions of the vehicle. To do this, the airbag ECU monitors the attitude of the vehicle and measures roll about the X, Y, and Z axes. To make these measurements, it is important that the airbag ECU be positioned as close as possible to the vehicle center of gravity.

The center of gravity for most vehicles is close in a position low in the vehicle and forward in the area of the front of the passenger compartment, such as in the area of the instrument panel/center console. As such, the most convenient place to mount the airbag ECU and its associated sensors in the center tunnel of the vehicle—the space exterior to the vehicle cabin where certain drive train components, such as the vehicle transmission and/or driveshaft are located. Space in the center tunnel is limited and the conditions in that location are harsh, as it can be exposed directly or indirectly to the exterior operating environment of the vehicle. Additionally, since the airbag ECU relies on many electrical connections with its associated sensors, the airbags it controls, and with other vehicle systems, such as a body control module (BCM), wiring can be difficult and the potential for contamination/corrosion of contacts can be heightened.

SUMMARY

A vehicle safety system includes sensors for sensing vehicle conditions and a controller for receiving data from the sensors, determining whether a vehicle crash event has occurred based on the data, and actuating one or more vehicle occupant protection devices in response to that determination. The vehicle safety system includes electronic components having an improved distributed architecture.

According to one aspect, a vehicle safety system for a vehicle includes an electronic control unit (ECU) and at least one remote crash sensor mounted in the vehicle at a location remote from the ECU and operatively connected to the ECU. The remote crash sensor is configured to sense vehicle crash conditions and to provide data related to the sensed vehicle crash conditions to the ECU. An ECU remote sensor is mounted in the vehicle at a location remote from the ECU and near a vehicle center-of-gravity (COG). The ECU remote sensor includes an inertial measurement unit (IMU), and is configured to sense vehicle roll conditions and to provide data related to the sensed vehicle roll conditions to the ECU. The ECU is operative to receive the data provided by the at least one remote crash sensor and the ECU remote sensor, perform calculations to determine whether the data is indicative of a vehicle crash condition, and to provide a signal for actuating a vehicle occupant protection device.

According to another aspect, alone or in combination with any other aspect, the ECU remote sensor can include a printed circuit board (PCB) and a plurality of electronic components mounted on the PCB. The electronic components can include at least one sensor for detecting roll motions of the vehicle. A soft inner layer of material can be over-molded onto the PCB. The soft inner layer can partially cover the PCB and covering the electronic components to provide environmental protection for the electronic components and the covered portions of the PCB. A hard outer layer of material can be over-molded onto and cover the soft inner layer and at least some of the uncovered portions of the PCB to bond the hard outer layer to both the soft inner layer and the PCB.

According to another aspect, alone or in combination with any other aspect, the ECU remote sensor can include at least one mounting bushing fixed to the PCB. The hard outer layer can be over-molded onto at least a portion of the at least one mounting bushing. The at least one mounting bushing can include surface features in which the outer layer material is received during molding. The outer layer when cured can provide a direct rigid connection between the outer layer and the at least one mounting bushing.

According to another aspect, alone or in combination with any other aspect, the inner layer can be constructed of a comparatively soft thermoplastic elastomer material, and the outer layer can be constructed of a glass reinforced nylon material.

According to another aspect, alone or in combination with any other aspect, the ECU remote sensor can be configured to be mounted in a central tunnel of the vehicle.

According to another aspect, alone or in combination with any other aspect, the airbag ECU can be mounted remotely from the vehicle COG.

According to another aspect, alone or in combination with any other aspect, the airbag ECU can be configured to be mounted in a central console of the vehicle, in an instrument panel of the vehicle, behind interior kick panel trim pieces of the vehicle, in the area of a glove box of the vehicle, under a vehicle hood in an engine compartment of the vehicle, under seats of the vehicle, or on a firewall of the vehicle.

According to another aspect, alone or in combination with any other aspect, the IMU can be configured to measure vehicle roll about at least one of X, Y, and Z vehicle axes.

According to another aspect, alone or in combination with any other aspect, the IMU can be configured to measure at least one of vehicle pitch, yaw, and roll.

According to another aspect, alone or in combination with any other aspect, the safety system can include a remote sensor bus interconnecting the ECU remote sensor to the ECU. The remote sensor bus can provide power for operating ECU remote sensor and a communication link by which to provide the data related to the sensed vehicle roll conditions to the ECU.

According to another aspect, alone or in combination with any other aspect, the ECU can include a main controller unit (MCU) and an ECU bus interface operatively connected to the MCU. The ECU remote sensor can include a remote sensor bus interface operatively connected to the IMU. The ECU bus interface and the remote sensor bus interface can be operable to facilitate powering the ECU remote sensor via the remote sensor bus and to facilitate communications between the ECU and the ECU remote sensor.

BRIEF DESCRIPTION OF THE DRAWINGS

For a better understanding, reference may be made to the accompanying drawings, in which:

FIGS. 3-5 are schematic illustrations of a portion of the vehicle safety system.

DESCRIPTION OF EMBODIMENTS

In this description of a vehicle safety system, reference is sometimes made to the left and right sides of a vehicle. These references should be understood as being taken with reference to the forward direction of vehicle travel. Thus, reference to the "left" side of a vehicle is meant to correspond to a driver side of the vehicle. Reference to the "right" side of the vehicle is meant to correspond to a passenger side of the vehicle.

Figure 1:
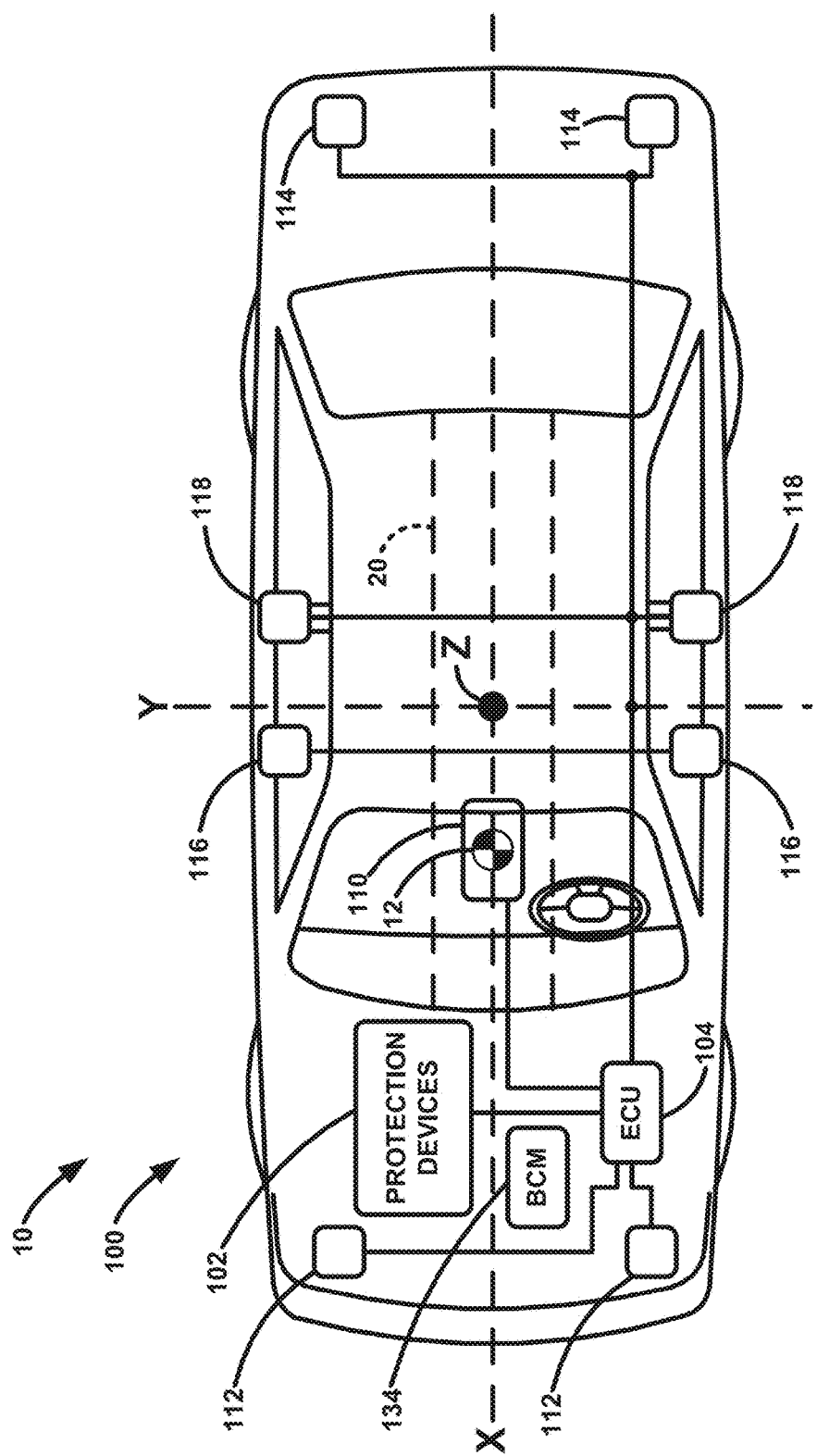
FIG. 1 is a schematic illustration of a vehicle safety system implemented in a vehicle.

Referring to FIG. 1, a vehicle 10 includes a vehicle safety system 100. The vehicle safety system 100 includes one or more actuatable vehicle occupant protection devices (illustrated schematically at 102), such as frontal airbags, side airbags, curtain air bags, knee bolster air bags, actuatable seatbelt pre-tensioners and/or retractors. The vehicle safety system 100 also includes an electronic control unit (airbag ECU) 104 that is operatively connected to the protection devices 102. The airbag ECU 104 is operative to control the actuation of the protection devices 102 in response to vehicle conditions sensed via one or more sensors to which the airbag ECU is operatively connected.

The vehicle safety system 100 includes several sensors for measuring certain conditions of the vehicle 10 that are utilized to determine whether to actuate the vehicle occupant protection devices 102. These sensors, such as accelerometers and/or pressure sensors, can be mounted at various locations throughout the vehicle 10 selected to allow for sensing the particular vehicle condition for which the sensor is intended. For example, the vehicle safety system 100 can include one or more frontal crash sensors 112 mounted forward in the vehicle 10 in the area, for example, of a front bumper (e.g., front-left and front-right). The vehicle safety system 100 can also include one or more rear crash sensors 114 mounted rearward in the vehicle 10 in the area, for example, of a rear bumper (e.g., rear-left and rear-right). The vehicle safety system 100 can also include one or more side sensors 116 mounted at driver and passenger side locations, such as in a vehicle door. Additionally, the vehicle safety system 100 can also include one or more rollover sensors 118 mounted at driver and passenger side locations, such as on a B-pillar of the vehicle 10.

The locations of these various sensors can be important in determining which amongst the various types of vehicle crash scenarios has taken place. This is referred to as crash discrimination. Not only is the position of the sensors important, but their orientations is also important. Front and rear crash sensors 112, 114 can, for example, be positioned and oriented to measure acceleration in directions parallel to the vehicle X-axis. Side crash sensors 116 can, for example, be positioned and oriented to measure acceleration in directions parallel to the vehicle Y-axis. Rollover sensors are sensitive to accelerations in directions parallel to the vehicle Z-axis, but can be positioned and oriented to measure acceleration in directions parallel to the vehicle X, Y, and Z-axis.

Positioning the frontal crash sensors 112 in front-left and front-right locations in the vehicle 10 can help the airbag ECU 104 discriminate between a full-frontal collision, such as a "head-on" collision, from an offset or oblique frontal collision, such as frontal collisions where portions of the vehicles overlap or where the vehicles impact at an angle. Positioning rear crash sensors 114 in rear-left and rear-right locations in the vehicle 10 can provide discrimination similar to the front crash sensors 112 for rear crash scenarios. Side crash sensors, as implied by their name, are positioned in the vehicle side structure, such as in a vehicle door, and thereby can help discriminate side impact events. Rollover sensors 118 are positioned close to midway along the length of the vehicle 10 and can be positioned high in the vehicle, such as on a vehicle B-pillar. This positioning allows for measuring acceleration of the side structure in directions parallel to the Z-axis, and those accelerations can help discriminate the occurrence of a rollover event.

The remote sensors 112, 114, 116, and 118 aid in discriminating the type of crash event that has taken place. The vehicle safety system 100 also includes one or more sensors that provide data that allows the airbag ECU 104 to make the threshold determination that a crash event has taken place. It is this determination that a crash event has taken place, in combination with the discrimination determination, that allows the airbag ECU 104 to determine which of the protection devices 102 to actuate.

Figure 2:
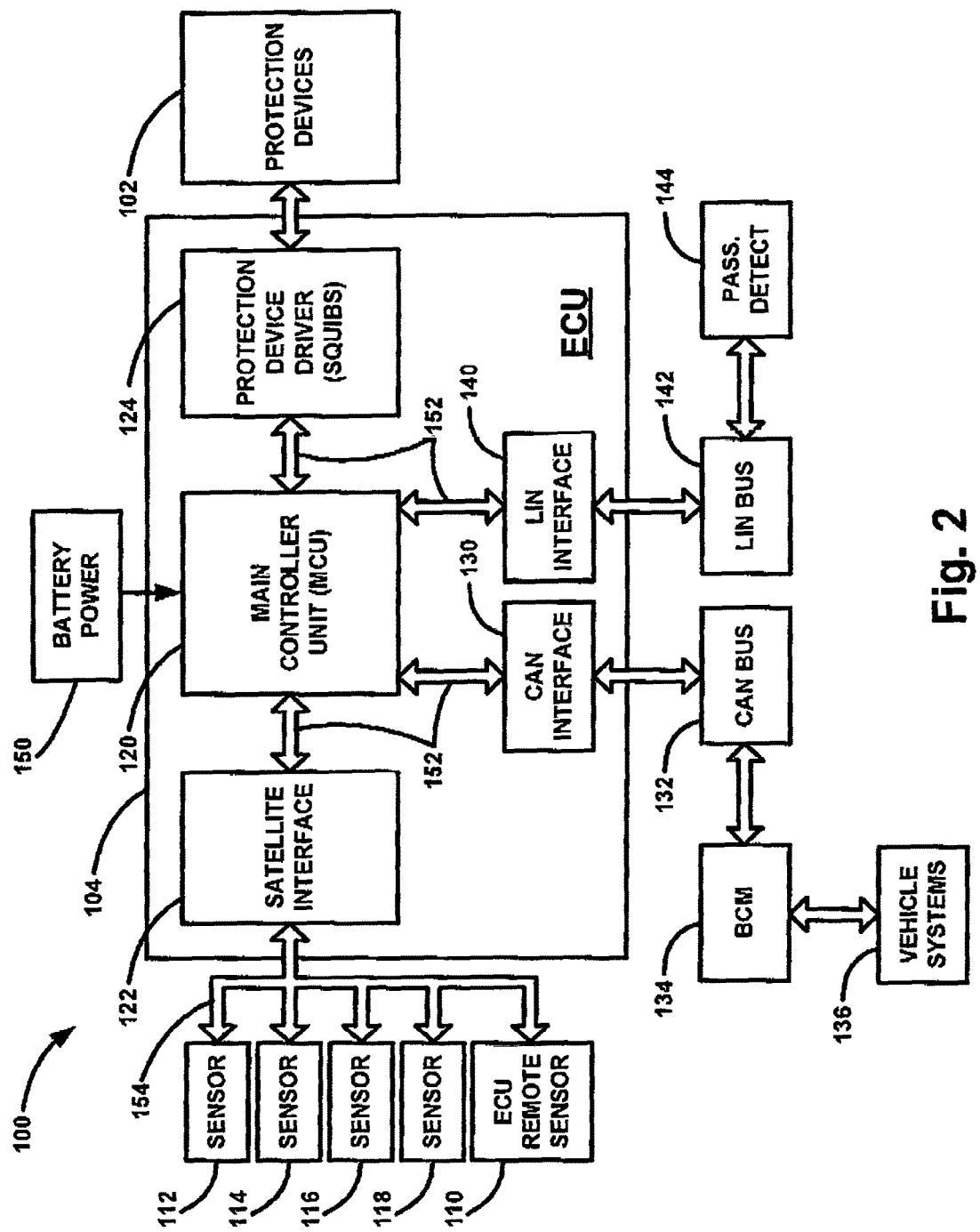
FIG. 2 is a block diagram of the vehicle safety system.

Referring to FIG. 2, it will be appreciated that the vehicle safety system 100 is a distributed system in which remote sensors 112, 114, 116, 118 are operatively connected to the airbag ECU 104, which is operatively connected the various occupant protection devices 102 provided in the vehicle 10. In FIG. 2, the general configuration of the airbag ECU 104 is illustrated for the purpose of illustrating the overall configuration of the vehicle safety system 100. FIG. 2 is not intended to be limiting in regard to the components of the safety system 100, their arrangement, and their respective interconnections. Those skilled in the art will appreciate that the configuration of the vehicle safety system 100 can vary and can be different from that illustrated in FIG. 2 without departing from the spirit and scope of the invention described herein.

Referring to FIG. 2, the airbag ECU 104 includes a main controller unit (MCU) 120 configured to receive data and perform calculations necessary to determine whether a vehicle collision has occurred and whether to actuate any of the vehicle occupant protection devices 102. The MCU 120 is operatively connected to a satellite (SAT) sensor bus interface 122 and to a protection device driver 124, for example, via internal serial bus connections, which facilitate high-integrity, fast and reliable communications between those components.

The MCU 120 is also operatively connected to a CAN bus interface 130 that provides communication via a vehicle controller area network (CAN) bus 132. The CAN bus 132 facilitates communications between the vehicle safety system 100 and a vehicle body control module (BCM) 134. The BCM 134 communicates via the CAN bus 132 with other vehicle systems 136, such as vehicle instrumentation, chassis control, stability control, traction/skid control, anti-lock braking (ABS), collision avoidance, tire pressure monitoring (TPMS). Through the CAN bus interface 130, the airbag ECU 104 can communicate with any of these systems to provide and/or receive data.

The MCU 120 is also operatively connected to a LIN bus interface 140 that provides communication via a vehicle local interconnect network (LIN) bus 142. This facilitates communications between the vehicle safety system 100 and systems or devices connected to the LIN bus 142, such as passenger detection systems and/or devices 144, such as seatbelt switches, seat position sensors, seat weight sensors, and occupant position sensors.

The airbag ECU 104 is connected to vehicle battery power 150 which provides power for operating the airbag ECU components. Communication between the airbag ECU components, i.e., the MCU 120, SAT interface 122, protection device driver 124, CAN interface 130, and LIN interface 140 can be facilitated via an internal bus 152 that provides both communication (serial communication) and power for driving their respective circuitries. In this respect, for example, the power supplied to the protection device driver 124 via the internal bus 152 can be used to energize the squibs that actuate the protection devices 102.

Additionally, the power supplied to the SAT sensor interface 122 can be used to power a remote sensor bus 154 that supplies power to the remote sensors 112, 114, 116, 118 and facilitates communications between the crash sensors and the MCU 120. In this configuration, the SAT interface 122 acts as a master device communicating with multiple slave devices (remote sensors 112, 114, 116, 118). The remote sensor bus 154 can, for example, implement a distributed system interface (DSI) bus protocol, which is specifically designed to perform this task. Advantageously, the remote sensor bus 154 can support serial and parallel sensor configurations. The specification for the DSI protocol is controlled by the DSI Consortium and can be found via internet at the website www.dsiconsortium.org.

The remote sensors 112, 114, 116, 118 sense their respective vehicle conditions and provide corresponding data streams to the SAT interface 122 of the airbag ECU 104, which passes the sensor data to the MCU 120, which implements control logic to determine whether the vehicle 10 is involved in a crash event for which deployment of any of the protection devices 102 is warranted. The sensors 112, 114, 116, 118 can be configured to provide raw crash data, such as raw-g data (for accelerometers) or relative pressure data (for pressure sensors). The MCU 120 performs calculations based on this data to determine whether to actuate any of the protection devices 102. At the same time, the airbag ECU 104, being operatively connected to the BCM 134 via the CAN bus 132, can provide data to the BCM that is relevant to the operation of any other vehicle systems (e.g., active steering, skid control, suspension/stability control) whose operation may rely on that data.

Figure 3:
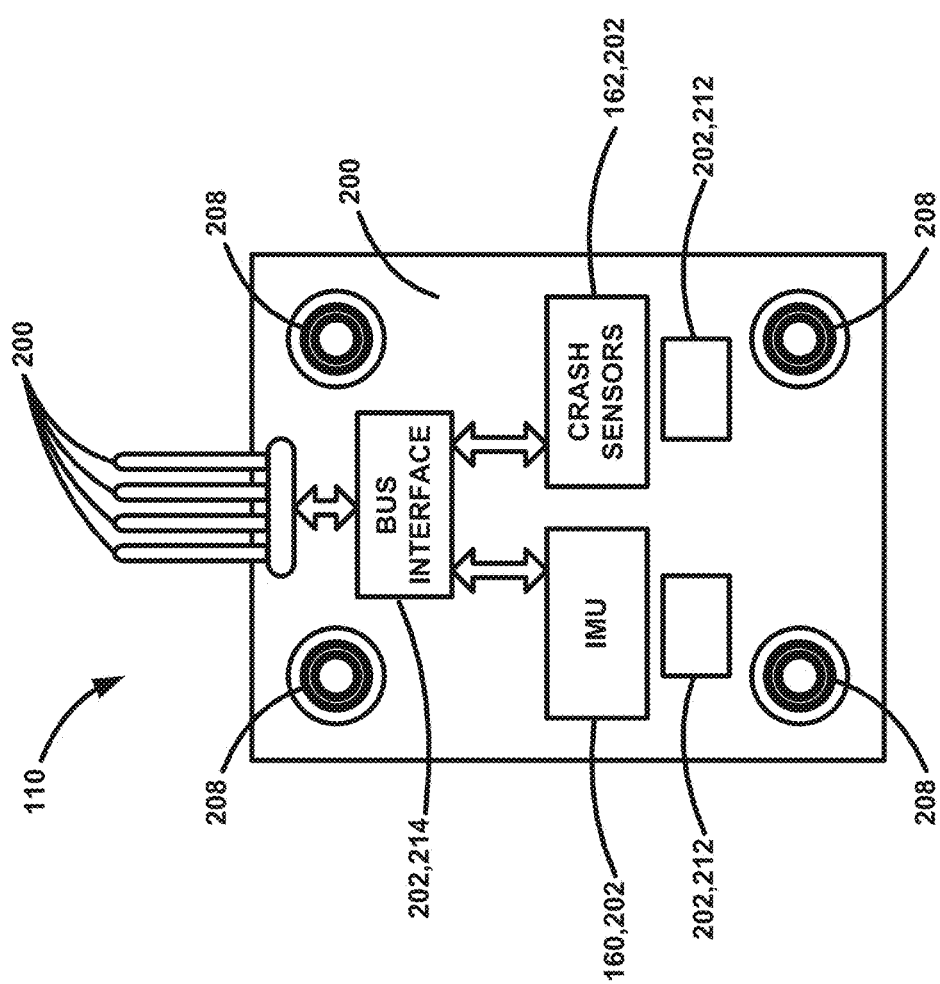
Figure 4:
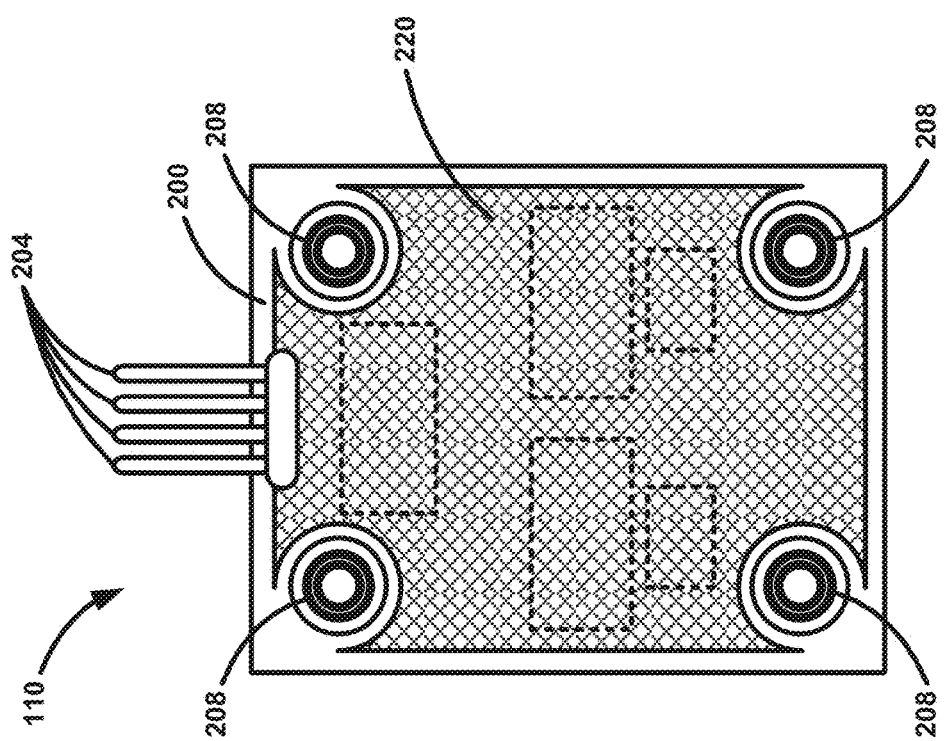

According to the invention, in addition to the remote sensors 112, 114, 116, 118, the vehicle safety system 100 also includes a ECU remote sensor 110. Referring to FIGS. 3-5, the ECU remote sensor 110 includes an inertial measurement unit (IMU) 160, and can also carry crash sensors 162, such as accelerometers. The ECU remote sensor 110 is "remote" because it is mounted in the vehicle 10 remotely from the airbag ECU 104. The sensors carried by the ECU remote sensor 110, i.e., the IMU 160 and any crash sensors 162, are those sensors that are traditionally housed within the airbag ECU itself. Airbag ECUs have traditionally been mounted at or near the vehicle center of gravity (COG) 12 because they include the sensors—IMU and crash sensors—that would benefit from COG positioning or that require COG positioning in order to provide the desired sensed vehicle data, i.e., sensed accelerations and roll motions.

The IMU 160 provides data related to rotation parameters of the vehicle 10 about three principal axes (X, Y, Z). These parameters include:
  Pitch—rotation about the vehicle Y-axis;
  Yaw—rotation about the vehicle Z-axis; and
  Roll—rotation about the vehicle X-axis.
The crash sensors 162 can provide crash determination data related to the linear acceleration of the vehicle 10 on the three principal axes (X, Y, Z). Alternatively, this function can be integrated in the IMU 160 so that the IMU provides data related to both linear acceleration and the rotation parameters of the vehicle 10. As a further alternative, the ECU remote sensor 110 can include only an IMU 160 configured to provide data related only to vehicle rotation. Since, however, crash indication can be best determined by measuring accelerations at or near the vehicle COG 12, and vehicle rotation indications are best measured about the vehicle X, Y, and Z axes, it can be advantageous to include both the crash sensors 162 and the IMU 160 in the ECU remote sensor 110.

The distributed architecture implemented in the vehicle safety system 100, utilizing the remote sensor bus 154, allows for separating the airbag ECU 104 and the ECU remote sensor 110. Separating the airbag ECU 104 and the ECU remote sensor 110 provides several benefits to the vehicle safety system 100. Separating the airbag ECU 104 from the ECU remote sensor 110 allows for flexibility in the installation and design of the vehicle safety system 100. The airbag ECU is typically mounted in a central tunnel 20 of the vehicle at or near the vehicle COG 12 because this is the ideal location to make vehicle crash determinations and to measure vehicle rotation. Since the central tunnel 20 has a limited amount of space, it can be difficult to mount the airbag ECU 104 in the tunnel. The ECU remote sensor 110 can be significantly smaller than the airbag ECU 104, thus making its installation simpler and less space consuming.

Removing location dependent sensors from the airbag ECU 104 allows the airbag ECU to be mounted at any convenient location on the vehicle 102. This can also reduce the size of the airbag ECU 104, due to the removal of sensor components. While the ECU remote sensor 110 is mounted in the limited space of the vehicle central tunnel 20, the airbag ECU 104 can be mounted in spaces where more room is available. Examples of airbag ECU 104 mounting locations can include, for example, in a central console of the vehicle, in the instrument panel, behind interior kick panel trim pieces, in the area of the glove box, under the hood in the engine compartment, under the vehicle seats, or on the firewall. The airbag ECU 104 can be mounted in any location that optimizes the performance of the vehicle safety system 100 and/or the ease and efficiency with which the safety system components are installed in the vehicle 10. The location of the airbag ECU 104 can be selected to produce shorter wiring harness lengths and/or easier wiring routings than what would be possible if mounted in the central tunnel 110.

The vehicle central tunnel 20 is a location subjected to environmentally harsh conditions, including moisture, contaminants, such as dirt and road salt, damage from rocks and other debris, heat, and excessive vibrations. Mounting the airbag ECU 104 remotely from the central tunnel 20 avoids the need to build the ECU housing and components to withstand these conditions. Subjecting only the ECU remote sensor 110 to these harsh conditions limits to the configuration of the ECU remote sensor the need to provide environmental protection from these conditions. This, of course, also makes necessary the need to protect the wire/cable of the remote sensor bus 154 connecting the ECU remote sensor 110 to the airbag ECU 104. Weatherization of wires/cables is, however, well-known and conventional techniques will suffice.

FIG. 3 illustrates an example configuration of the ECU remote sensor 110. The ECU remote sensor 110 includes a printed circuit board ("PCB") 200 or other suitable structure (e.g., substrate, lead frame, printed wire board, flex circuit) upon which several electronic components 202 are mounted. Electrical connection pins 204 provide a means by which to electrically connect the printed circuit board 200 and the cable 206 that connects the ECU remote sensor 110 to the ECU 104. At each of the four corners of the rectangular PCB 200, the ECU remote sensor 110 includes a mounting bushing 208 that is mechanically fixed to the PCB, for example, by one or more of an interference fit, a mechanical fastening, and an adhesive. The mounting bushings 208 can, for example, be constructed of a metal alloy, such as stainless steel or brass, that provides a strong, reliable, and corrosion resistant connection.

The electronic components 202 can include the IMU 160 and crash sensors 162. The electronic components 202 also include one or more components 212 for facilitating the operation of the IMU 160 and/or crash sensors 162, such as processors, communication interface components, and power conditioning/management components, resistors, diodes, capacitors, etc. The electronic components 202 further include a remote sensor bus 214 interface that, in conjunction with satellite sensor bus interface 122, facilitates the ECU 104 providing power to the ECU remote sensor 110 via the remote sensor bus 154. The remote sensor bus 214 interface and the satellite sensor bus interface 122 also facilitate communications between the ECU 104 and the ECU remote sensor 110 via the remote sensor bus 154.

Since the ECU remote sensor 110 can be subjected to harsh environmental conditions in the central tunnel 20, the ECU remote sensor 110 is constructed in a manner that provides rugged environmental protection. At the same time, since the purpose of the ECU remote sensor 110 is to sense vehicle impacts and/or roll conditions, it is important to provide a rigid link between the vehicle 10 and the IMU/crash sensors 210 so that the sensors can respond immediately to vehicle motions. This can help to reduce delays in ECU remote sensor 110 response time.

To serve these interests, the ECU remote sensor 110 has a two-layer over-molded construction including a first, soft inner layer 220 and a second, hard outer layer 230. Referring to FIGS. 4 and 5, the soft inner layer 220 is over-molded onto the printed circuit board 200 and the electronic components 202 mounted thereon, for example, via insert molding. Once cured, the hard outer layer 230 is over-molded onto/over the inner layer 220, again, for example, by insert molding. The material used to construct the inner layer 220 can be a soft rubber, rubber-like plastic, elastomeric, or polymeric material, such as a thermoplastic elastomer.

Referring to FIG. 4, the inner layer 220 at least partially covers the PCB 200 and covers the electronic components 202 mounted on the PCB. The inner layer 220 protects the electrical components 202 and the PCB 200 from moisture exposure and also helps prevent damage to the PCB and electronic components due to differentials in thermal expansion of the PCB, electronic components, and outer layer 230, which can create potentially damaging shear forces.

Figure 6B:
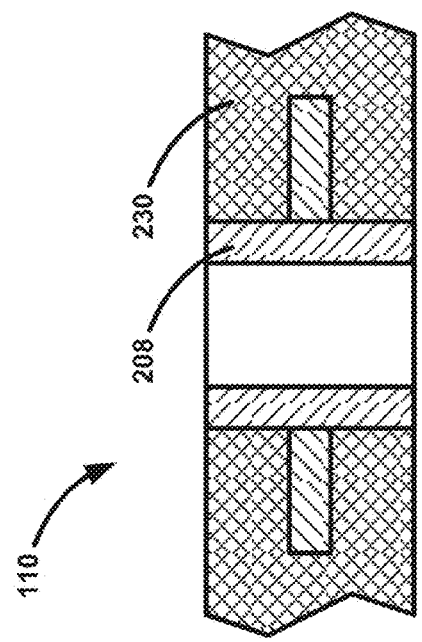
FIG. 6B is a magnified sectional view taken generally along line 6B-6B in FIG. 5.
Figure 6A:
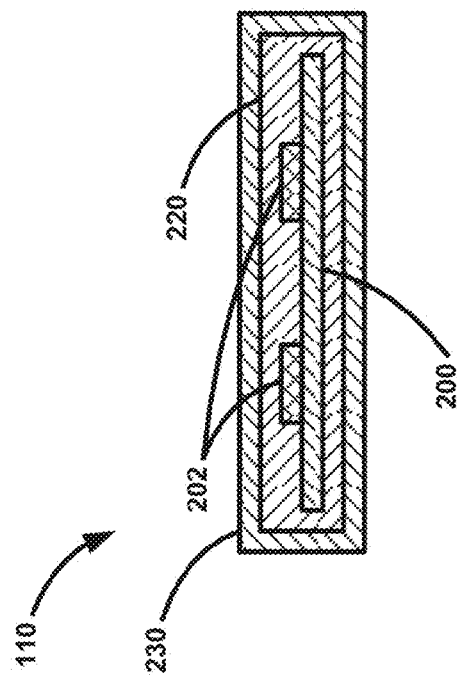
FIG. 6A is a sectional view taken generally along line 6A-6A in FIG. 5.

As shown in FIG. 4, selected portions of the PCB 200, such as portions of the corners around the bushings 208, can remain uncovered by the soft inner layer 220 so that they are exposed for hard contact with the hard outer layer 230. This provides a direct connection between the outer layer 230 and the PCB 200, which provides a rigid link between the outer layer and the PCB. Referring to FIG. 6B, the mounting bushings 208 can have an axial length selected to leave exposed axial portions adjacent one or both surfaces of the PCB 200. The outer layer 230 can be molded onto these exposed axial portions and thereby secure the outer layer to both the PCB and the mounting bushings. To promote this connection, the outer circumference of the mounting bushings 208 can have a non-smooth (e.g., roughened, knurled, threaded, etc.) surface to promote a mechanical connection with the molten material of the outer layer 230 during molding.

As shown in FIG. 5, the outer layer 230 can also include a portion 232 of a connector assembly 236 (e.g., wire harness) for the cable 206, such as a shroud, that receives a mating portion 234 of the connector assembly, such as a terminal connector, that terminates the cable. The terminal connector 234 can be inserted into the shroud 232, which locks the two connector assembly 236 while, at the same time, the pins 204 of the ECU remote sensor 110 are received in the terminal connector and, establishing an electrical connection between the ECU remote sensor and the cable. The connector assembly 236 can also include features, such as gaskets or silicone seals, that weatherproof the electrical connection.

In an example construction, the outer layer 230 can be made at least partially from a nylon material, e.g., glass reinforced nylon—PA66 GF (glass reinforced polyamide 66) or PBT (polybutylene terephthalate). The material used to form the outer layer 230 can be selected to provide a reliable degree of bonding and adhesion with the material of the inner layer 220.

The outer layer 230 forms a continuous seamless molded structure that surrounds the electronic components 202 and the PCB 200, leaving exposed only the connector pins 204 and the mounting bushings 208. Mounting the ECU remote sensor 110 to the vehicle 10 via the bushings provides a rigid link between the PCB mounted sensors 202 to the vehicle. This improves the transmission of impact and roll motions from the vehicle to the sensors 202. The mounting bushings 208 provide a rigid link between the vehicle 10 and the PCB 200, which the outer layer 230 fortifies through its being molded onto both the PCB and the bushings.

From the above description of the invention, those skilled in the art will perceive improvements, changes and modifications. Such improvements, changes and modifications within the skill of the art are intended to be covered by the appended claims.

Having described the invention, the follow is claimed:
1. A vehicle safety system for a vehicle, the safety system comprising:

an airbag electronic control unit (ECU) comprising a main controller unit (MCU), a vehicle controller area network (CAN) bus interface, a vehicle local interconnect network (LIN) bus interface, and a satellite (SAT) sensor bus interface;

at least one remote crash sensor for being mounted in the vehicle at a location remote from the airbag ECU, the at least one remote crash sensor being configured to sense vehicle crash conditions and to provide a crash data signal comprising data related to the sensed vehicle crash conditions;

at least one ECU remote sensor for being mounted in the vehicle at a location remote from the ECU and near a vehicle center-of-gravity (COG), the at least one ECU remote sensor comprising an inertial measurement unit (IMU), and a remote sensor bus interface, wherein the at least one ECU remote sensor is configured to provide a roll data signal related to sensed vehicle rotation about the COG;

a remote sensor bus interconnecting the SAT sensor bus interface to the ECU remote sensor bus interface, wherein the airbag ECU provides via the remote sensor bus power for operating ECU remote sensor and a communication link over which the at least one ECU remote sensor communicates the roll data signal to the airbag ECU;

wherein the airbag ECU is operative to receive via the remote sensor bus the crash data signal and the roll data signal, to receive via the CAN bus interface a vehicle condition data signal, to receive via the LIN bus interface occupant condition data signal, wherein the airbag ECU is further operative to perform calculations in response to the vehicle condition data signal, the occupant condition data signal, the crash data signal, and the roll data signal to determine the occurrence of a vehicle crash condition and to provide a signal for actuating a vehicle occupant protection device in response thereto.

2. The vehicle safety system recited in claim 1, wherein the ECU remote sensor comprises:
   a printed circuit board (PCB);
   a plurality of electronic components mounted on the PCB, the plurality of electronic components comprising at least one sensor for detecting roll motions of the vehicle;
   a soft inner layer of material over-molded onto the PCB, the soft inner layer partially covering the PCB and covering the electronic components to provide environmental protection for the electronic components and the covered portions of the PCB; and
   a hard outer layer of material over-molded onto and covering the soft inner layer and at least some of the uncovered portions of the PCB to bond the hard outer layer to both the soft inner layer and the PCB.

3. The vehicle safety system recited in claim 2, wherein the ECU remote sensor further comprises at least one mounting bushing fixed to the PCB, wherein the hard outer layer is over-molded onto at least a portion of the at least one mounting bushing, and wherein the at least one mounting bushing comprises surface features in which the outer layer material is received during molding, the outer layer when cured providing a direct rigid connection between the outer layer and the at least one mounting bushing.

4. The vehicle safety system recited in claim 2, wherein the inner layer is constructed of a comparatively soft thermoplastic elastomer material, and the outer layer is constructed of a glass reinforced nylon material.

5. The vehicle safety system recited in claim 1, wherein the ECU remote sensor is configured to be mounted in a central tunnel of the vehicle.

6. The vehicle safety system recited in claim 1, wherein the airbag ECU is mounted remotely from the vehicle COG.

7. The vehicle safety system recited in claim 6, wherein the airbag ECU is configured to be mounted in a central console of the vehicle, in an instrument panel of the vehicle, behind interior kick panel trim pieces of the vehicle, in the area of a glove box of the vehicle, under a vehicle hood in an engine compartment of the vehicle, under seats of the vehicle, or on a firewall of the vehicle.

8. The vehicle safety system recited in claim 1, wherein the IMU is configured to measure vehicle roll about at least one of X, Y, and Z vehicle axes and to provide data regarding the measured vehicle roll in the roll data signal.

9. The vehicle safety system recited in claim 1, wherein the IMU is configured to measure at least one of vehicle pitch, yaw, and roll.

10. The vehicle safety system recited in claim 1, wherein:
   the vehicle condition data signal comprises data related to at least one of vehicle instrumentation, chassis control, stability control, traction/skid control, anti-lock braking (ABS), collision avoidance, tire pressure monitoring (TPMS); and
   the occupant condition data signal comprises data related to passenger detection systems and/or devices comprising at least one of seatbelt switches, seat position sensors, seat weight sensors, and occupant position sensors.

* * * * *